US005684949A

United States Patent [19]

Naclerio

[11] Patent Number: 5,684,949

[45] Date of Patent: Nov. 4, 1997

[54] METHOD AND SYSTEM FOR SECURING OPERATION OF A PRINTING MODULE

[75] Inventor: Edward J. Naclerio, Madison, Conn.

[73] Assignee: Pitney Bowes Inc., Stamford, Conn.

[21] Appl. No.: 542,483

[22] Filed: Oct. 13, 1995

[51] Int. Cl.[6] ........ G06F 11/00

[52] U.S. Cl. ........ 395/186; 364/235; 364/918.52; 364/930; 380/51

[58] Field of Search ........ 395/186, 188.01; 364/464.02, 235, DIG. 2, 930, 918.52; 101/71; 380/51; 371/33, 34

[56] References Cited

U.S. PATENT DOCUMENTS

| | | | |
|---|---|---|---|
| 4,813,912 | 3/1989 | Chickneas et al. | 364/464.02 |
| 4,831,555 | 5/1989 | Sansone et al. | 364/519 |
| 4,858,138 | 8/1989 | Talmadge | 364/464.02 |
| 4,934,846 | 6/1990 | Gilham | 400/104 |
| 5,077,729 | 12/1991 | Wong | 359/110 |
| 5,293,465 | 3/1994 | Abumehdi et al. | 395/113 |
| 5,471,925 | 12/1995 | Heinrich et al. | 101/91 |

*Primary Examiner*—Robert W. Beausoliel, Jr.
*Assistant Examiner*—Dieu-Minh Le
*Attorney, Agent, or Firm*—Steven J. Shapiro; Melvin J. Scolnick

[57] ABSTRACT

A method for securing a postage transaction in a postage meter having an accounting module and a printing module includes A) storing a plurality of data patterns in the accounting module; B) storing the plurality of data patterns in the printing module; C) utilizing one of the accounting module and the printing module to request that a specific one of the plurality of data patterns be sent from the other of the accounting module and the printing module to the one of the accounting module and the printing module; D) sending a return data pattern from the other of the accounting module and the printing module to the one of the accounting module and the printing module in response to the request of step C); E) determining if the return data pattern and the specific one of the plurality of data patterns are the same; and F) initiating printing by the printing module only when in step E) it is determined that the return data pattern and the specific one of the plurality of data patterns are the same. A systems incorporates the method set forth above.

8 Claims, 1 Drawing Sheet

METHOD AND SYSTEM FOR SECURING OPERATION OF A PRINTING MODULE

BACKGROUND

The instant invention is directed toward a method and a system for securing the operation of a printing module, and more particularly for securing a printhead utilized in a value dispensing apparatus such as a postage meter.

Traditional postage meters imprint an indicia on a mailpiece as evidence that postage has been paid. These traditional postage meters create the indicia using a platen or a rotary drum which are moved into contact with the piece to imprint the indicia thereon. While traditional postage meters have performed admirably over time, they are limited by the fact that if the indicia image significantly changes, a new platen or rotary drum will have to be produced and placed in each meter. Accordingly, newer postage meters now take advantage of modern digital printing technology to overcome the deficiencies of traditional meters. The advantage of digital printing technology is that since the digital printhead is software driven, all that is required to change an indicia image is new software. Thus, the flexibility in changing indicia images or adding customized ad slogans is significantly increased.

Modern digital printing technology includes bubble jet, piezoelectric ink jet, and thermal printing techniques which all operate to produce images by dot-matrix printing. In dot-matrix inlet jet and bubble jet printing, individual print elements in the printhead (such as resisters or piezoelectric elements) are either electronically stimulated or not stimulated to expel or not expel, respectively, drops of ink from a reservoir onto a substrate. Thus, by controlling the timing of the energizing of each of the individual print elements in conjunction with the relative movement between the printhead and the mailpiece, a dot-matrix pattern is produced in the visual form of the desired indicia. However, in postage meters employing digital printers, data representing an indicia image is typically sent by an accounting module directly to the printhead via an unsecured (not physically secured) electrical line. Thus, data sent between the accounting module and the printhead are subject to interception. If the data signals are intercepted and passed through a logic analyzer, they can be copied, reproduced, and sent directly to the printhead thereby bypassing the accounting module such that no accounting for the printed postage occurs.

Prior art devices have attempted to overcome the above problems by requiring that in authentication procedure between the printhead and the accounting module must occur before printing of the indicia is possible. Typically, the authentication procedure requires an exchange of encrypted data between the printhead and meter vault. Both the printhead and the meter vault have encryption keys stored therein as well as an encryption algorithm, such as the Data Encryption Standard (DES) or RSA (Rivest, Shamir, and Adelman) to permit the encrypted communication. If the authentication process does not occur, printing is not enabled.

A problem with the known encrypted authentication procedure is that a large amount of memory is required to implement the encryption algorithm in both the printhead and the vault. The need for such memory and associated hardware drives up the cost of the meter and requires the use of high speed microprocessors to perform the authentication in a timely manner.

SUMMARY OF THE INVENTION

It is an object of the invention to provide a simple and cost effective system for providing security in a device utilizing a digital printhead.

It is yet another object of the invention to provide a system which authenticates that a printhead is validly enabled by a second module to which it is operatively connected.

The above objects are met by a system for safeguarding information to be printed by a printing device including a first module having a first non-volatile memory in which a plurality of dam patterns are stored; and a second module having a second non-volatile memory in which the plurality of data patterns are stored; wherein the first module further includes means for sending a signal to the second module requesting that a specific one of the plurality of data patterns be sent from the second module to the first module, the second module further includes means for receiving the signal and for sending a return data pattern to the first module in response to the signal, and the first module further includes means for determining if the return data pattern and the specific one of the data patterns are the same and for initiating printing by the printing device only when the return data pattern and the specific one of the data patterns are the same.

It is yet another object to provide a method for securing a transaction in a postage meter having an accounting module and a printing module, the method including: A) storing a plurality of data patterns in the accounting module; B) storing the plurality of data patterns in the printing module; C) utilizing one of the accounting module and the printing module to request that a specific one of the plurality of data patterns be sent from the other of the accounting module and the printing module to the one of the accounting module and the printing module; D) sending a return data pattern from the other of the accounting module and the printing module to the one of the accounting module And the printing module in response to the request of step C); E) determining if the return data pattern and the specific one of the plurality of data patterns are the same; and F) initiating printing by the printing module only when in step E) it is determined that the return data pattern and the specific one of the plurality of data patterns are the same.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
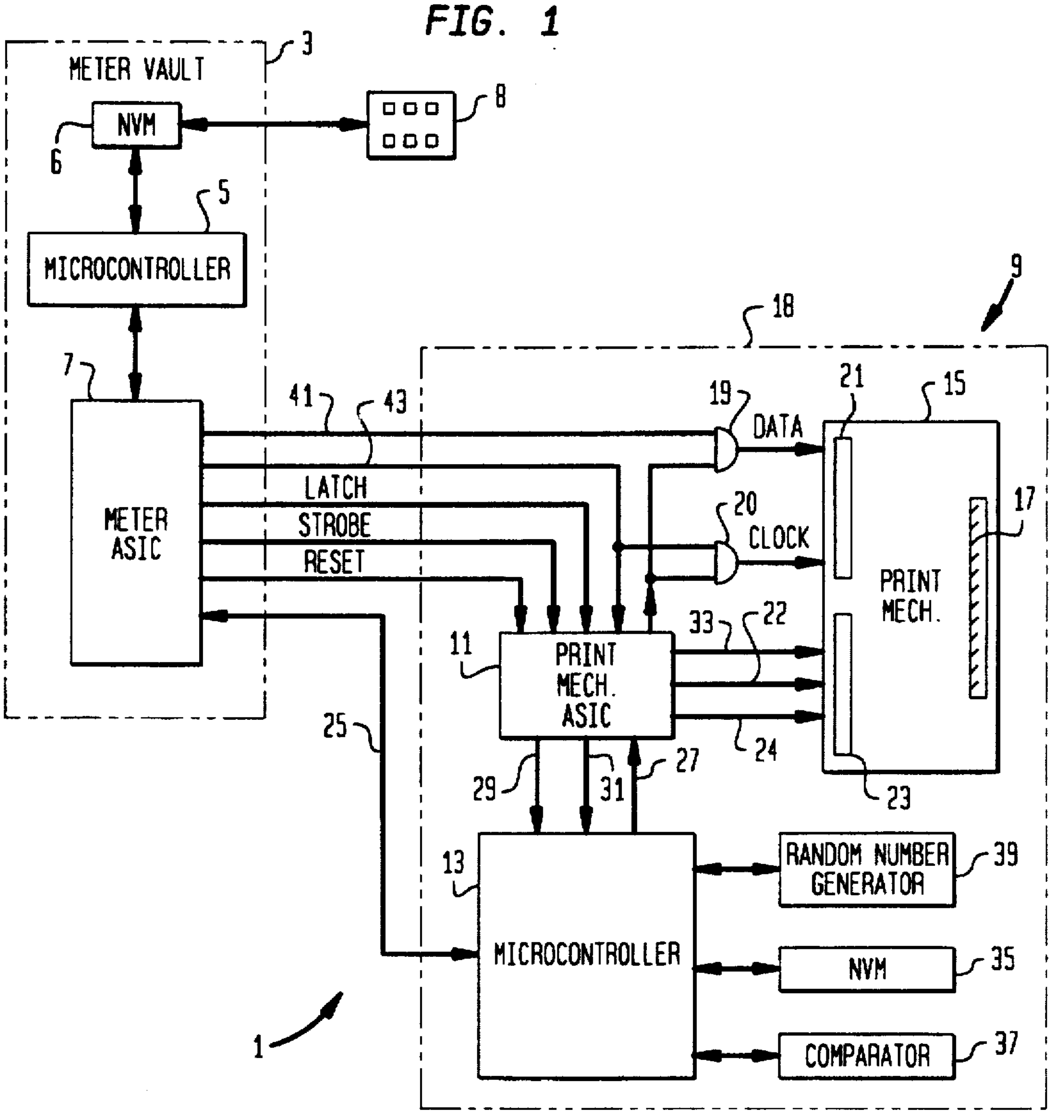
FIG. 1 is a block diagram of a postage meter incorporating the instant invention.

Referring to FIG. 1, a postage meter 1 includes a vault 3 including a microcontroller 5 and an application specific integrated circuit (ASIC) 7. Microcontroller 5 includes associated non-volatile memory 6 for funds storage. NVM 6 includes a descending register, an ascending register, and a control sum register, as is known in the art. The ascending register identifies the total funds that have been expended over the life of the meter, the descending register identifies the funds currently available, and the control sum represents the total amount of funds added to the meter over its lifetime. Thus, in operation, when a desired postage transaction is requested, the desired postage amount is typically sent to microcontroller 5 via a keyboard 8. Microcontroller 5 checks to see if sufficient funds are available in the descending register, and if they are, micro controller 5 debits that amount from the descending register and adds it to the ascending register.

Microcontroller 5 also has stored in NVM 6 the postage indicia image data which is formatted for printing by a particular printhead. Once the above-mentioned debiting occurs, microcontroller 5 begins transferring the indicia image data to a printhead module 9 via ASIC 7. Printhead module 9 includes a printhead ASIC 11, a microcontroller 13, and a printing mechanism 15 (such as an inkjet printhead) including a plurality of individually energized nozzles 17. Printhead module 9 includes a housing 18 physically secured by, for example, epoxy so that the ASIC 11, microcontroller 13 and printing mechanism 15 are all physically secured therein. The indicia image data are transferred from NVM 6 to ASIC 7 as a number of bytes of data under either software executed by microcontroller 5 or direct memory access control incorporated within ASIC 7. ASIC 7 then transfers the indicia image data in bit serial fashion together with a clock signal to respective AND gates 19, 20 and to ASIC 11. The clock and image data signals are then sent via respective AND gates 19, 20 to a shift register 21 of printing mechanism 15 upon receipt by gates 19, 20 of an appropriate high or low signal generated by ASIC 11. When shift register 21 is filled with a line of data, ASIC 7 sends a latch signal 22 via ASIC 11 to enable transfer of data from shift register 21 to a holding register 23. When the line of data is ready for printing, ASIC 7 sends a strobe signal 24 via ASIC 11 to holding register 23 which in turn is enabled to energize nozzles 17 in accordance with the bit stream contained in holding register 23.

Microcontroller 13 is in electrical communication with both ASIC 7 and ASIC 11 via respective half-duplex serial input/output communication links 25,27. ASIC 11 provides clock and reset signals 29,31 to microcontroller 13 and a reset signal to printing mechanism 15. Moreover, to protect the transmitted image data signals from being easily intercepted and reproduced, microprocessor 13 is programmed to initiate a link test with ASIC 7 prior to printing occurring. That is, when a postage request is made, microprocessor 13 and ASIC 7 will perform an authentication routine to authorize printing of the indicia. Authentication is accomplished without the use of a complex encryption algorithm. Vault 3 has stored in NVM 6 a plurality of bit patterns which are each individually obtainable by ASIC 7. Microcontroller 13 also has the same plurality of bit patterns stored in an associated NVM 35. Upon a request for postage, microcontroller 13 initiates the link test by sending a signal via communication link 25 requesting that one of the known bit patterns be sent from ASIC 7 to ASIC 11. ASIC 7 sends a return bit pattern to ASIC 11 in response to the request by microcontroller 13. Upon receipt of the return bit pattern, ASIC 11 then sends the bit pattern received from ASIC 7 to microcontroller 13. Microcontroller 13 determines if the returned bit pattern matches the bit pattern requested. If it does, microcontroller 13 sends a signal to ASIC 11, via communications link 27, authorizing ASIC 11 to enable printing mechanism 15 to print. That is, when the authorization signal is received by ASIC 11 it 156 sends the required high or low signal to AND gates 19, 20 enabling the image data to be sent to shift register 21 together with the clock signal, 2) sends the latch signal 22 to transfer the contents of shift register 21 to holding register 23, and 3) sends the strobe signal 24 to energize nozzles 17. In the event that an incorrect data pattern or no data pattern is received by microcontroller 13 from ASIC 11, microcontroller 13 will not send the appropriate high or low signal to gates 19, 20 thereby preventing printing from occurring.

The disabling of printing mechanism 17 as set forth above can either be temporary or permanent. In the temporary mode, printing mechanism 17 is only disabled until a new authorization procedure is correctly completed. In terms of this specification, the permanent disabling of printing mechanism 17 means that printing mechanism 17 can only be re-enabled for printing via a special service procedure requiring the services of a service person. Furthermore, a combination of temporary and permanent disable merit could be utilized in the meter. That is, a register in NVM 35 could be used to track the total number of unsuccessful authorization attempts which have been made (number of temporary disablements). If a predetermined number of unsuccessful attempts is exceeded, the permanent disablement mode is entered.

Figure 2:
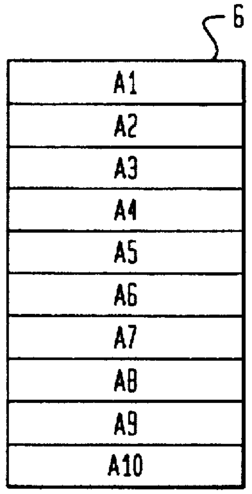
FIG. 2 is a representation of addresses in a non-volatile memory in the postage meter.

Moreover, in the preferred embodiment, a very simple way of requesting a specific bit pattern during the authorization procedure is used. Referring to FIG. 2, a portion of NVM 6 includes 10 addresses A1 to A10 which each contain a unique bit pattern. NVM 35 of microprocessor 13 includes an identical corresponding set of 10 addresses having the same unique bit patterns as addresses A1 to A10. Thus, when the authentication procedure is to occur, microprocessor 13 sends a signal to ASIC 7 requesting that ASIC 7 send the bit pattern contain ed in a specific one of addresses A1 to A10. ASIC 7 retrieves the desired bit pattern from NVM 6 and sends it to Microcontroller 13 via ASIC 11. Microcontroller 13 has a conventional comparator 37 therein which compares the requested bit pattern with the received bit pattern And only authorizes printing if the patterns match. If they don't, printing is disabled in any of the manners discussed above.

The request by microcontroller 13 for a specific bit pattern can be randomized so that the same bit pattern is not continuously requested. This randomization helps to prevent the interception and reproduction of the request signal of the microcontroller 13. Moreover, if the number of bit patterns stored is very large, the reproduction of request signals becomes even more difficult. The randomization can be accomplished by a random number generator which generates a number from 1 to 10 which number corresponds to a specific memory address A1 to A10.

In order to further prevent interception and reproduction of the bit pattern request signal of microcontroller 13, the bit pattern request signal associated with each stored bit pattern can be pseudo-randomized such that the bit pattern request signal associated with a particular address A1 to A10 will vary for each transaction. The varying of the request signal in a pseudo-random manner can be accomplished using a wrap-around table incorporating modular arithmetic principles. In operation, microprocessor 13 is programmed such that the first time it requests a specific bit pattern, it utilizes a predetermined address offset of, for example, 4 addresses. Therefore if microprocessor 13 wants the contents of address A5 returned to it by ASIC 7, it sends a signal requesting the bit pattern for address A1. ASIC 7 is also programmed to the predetermined offset of four addresses so that it interprets the request for the contents of address A1 as a request to send the contents of address A5. For all subsequent postage transactions, microcontroller 13 is programmed to request in a random fashion the contents of a particular one of addresses A1 to A10. However, the signal that microcontroller 13 sends to ASIC7 for a particular address A1 to A10 vary depending upon the last address requested in the immediately preceding postage transaction. That is, referring back to the initial request, both ASIC 7 and Microcontroller 13 have stored in corresponding NVM's 6,35 the address of the bit pattern sent for the last transaction, which in the above example was address A5. Suppose that the random number generator 39 in microcontroller 13 determines that for the next transaction the contents of address A9 should be requested. Microcontroller 13 is programmed to look at the positional relationship between the last address requested and the next desired address request to determine what request signal should be sent in the above situation, the difference between addresses A5 and A9 is four addresses, so the signal from microcontroller 13 to ASIC 7 requests that the contents of address A4 be sent. ASIC 7 has the same programming as microcontroller 13 and therefore is able to identify the request for the contents of address A4 as a request for the contents of address A9. Moreover, assuming that for the next postage transaction, the random number generator in microcontroller 13 identifies that the contents of address A5 should again be requested, microcontroller 13 would send out a signal requesting the contents of address A6 since the difference in the wrap around table of FIG. 2 between addresses A9 and A5 is 6 addresses moving along the table from A1 toward A10 and then back to A1. Thus, the request signal generated by microcontroller 13 for the contents of any individual address A1 to A10 will constantly vary based upon the last address request and the instant desired address request. The varying of the request signal associated with a particular address in a psuedo-random mannor provides additional security in that the ability to duplicate the authorization procedure becomes extremely complex. That is, since the printhead module 18 is sealed, if an address request signal for the contents of a particular address is made by microcontroller 13, it would be very difficult for an unauthorized vault to provide the correct bit data pattern due to the varying address request signal associated with a particular address.

For further electrical security, the clock and data signals 41, 43 generated from vault 3 will be driven at ground potential when the meter is powered up but no data is being sent. Thus, when meter 1 is powered up (by a conventional power supply circuit not shown)and no data is being sent, the clock and data lines 41,43 will be driven in a low state (typically between 0 Volts and 8 Volts). If someone wanted to send their own data and clock signals while the meter was in this state, they would have to drive the clock and data signals from the low to the high state (typically between 3.5 volts and 5 volts). However, the power required to do this would be very high and would likely damage the circuit, thereby rendering the meter useless.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A method for securing a postage transaction in a postage meter having an accounting module and a printing module, the method comprising the steps of:

A) storing a plurality of authentication data patterns in the accounting module;

B) storing the plurality of authentication data patterns in the printing module;

C) storing postage transaction image data in the accounting module;

D) sending the postage transaction image data from the accounting module to the printing module;

E) utilizing one of the accounting module and the printing module to request that a specific one of the plurality of authorization data patterns be sent from the other of the accounting module and the printing module to the one of the accounting module and the printing module;

F) sending a return data pattern from the other of the accounting module and the printing module to one of the accounting module and the printing module in response to the request of step E;

G) determining if the return data pattern and the specific one of the plurality of authentication data patterns are the same; and H) initiating printing by the printing module utilizing the postage transaction image data received from the accounting module only when in step G) it is determined that the return data pattern and the specific one of the plurality of authentication data patterns are the same.

2. A method as recited in claim 1, further comprising randomizing for subsequent postage transaction which of the plurality of authentication of data patterns is requested by the one of the accounting module and the printing module to be returned to it by the other of the accounting module and the printing module.

3. A method as recited in claim 2, further comprising associating each of a plurality of signals with a corresponding one of the plurality of authentication data patterns and during step B) utilizing the one of the accounting module and the printing module to send one of the plurality of signals to the other of the accounting module and the printing module, which sent signal requests that its corresponding one of the plurality of authentication data patterns be returned as the return data pattern to the one of the accounting module and the printing module by the other of the accounting module and the printing module.

4. A method as recited in claim 3, further comprising for subsequent postage transactions reassociating each of the plurality of signals with a different corresponding one of the plurality of authentication data patterns.

5. A method as recited in claim 4, further comprising psuedo-randomizing the reassociating of each of the plurality of signals with the different corresponding one of the plurality of authentication data patterns.

6. A method as recited in claim 5, wherein each of the plurality of signals identifies a memory address in the other of the accounting module and the printing module, which memory address contains the different corresponding one of the plurality of authentication data patterns.

7. A method as recited in claim 1, wherein during step B) the postal image data is sent in unencrypted form from the accounting module to the printing module.

8. A system for safeguarding information to be printed by a printing device, the system comprising:

a first module having a first non-volatile memory in which a plurality of authentication data patterns are stored; and a second module having a second non-volatile memory in which the plurality of authentication data patterns and graphical image data are stored;

wherein the first module further includes means for sending a signal to the second module requesting that a specific one of the plurality of authentication data patterns be sent from the second module to the first module, the second module further includes means for receiving the signal and for sending a return data pattern selected from the plurality of authentication data patterns to the first module in response to the signal and for sending the graphical image data to the first module, and the first module further includes means for determining if the return data pattern received from the second module and the specific one of the plurality of authentication data patterns are the same and for initiating printing by the printing device utilizing the graphical image data only when the return data pattern and the specific one of the plurality of authentication data patterns are the same.

* * * * *